United States Patent Office 3,278,465
Patented Oct. 11, 1966

3,278,465
MANUFACTURE OF CELLULAR POLYURETHANE MATERIALS IN THE PRESENCE OF A POLYSILOXANE STABILIZER
Harry James Twitchett and Edward Jervis Vickers, Manchester, England, assignors to Imperial Chemical Industries Limited, London, England, a corporation of Great Britain
No Drawing. Filed June 24, 1963, Ser. No. 290,220
Claims priority, application Great Britain, June 28, 1962, 24,939/62
8 Claims. (Cl. 260—2.5)

This invention relates to improvements in or relating to the manufacture of polyurethane materials, in particular foamed cellular polyurethane materials.

It is known to prepare polyurethane materials by reaction of organic polyisocyanates with compounds containing active hydrogen atoms for example hydroxyl group-containing compounds. It is further known to modify the reaction by for example appropriate choice of reactants or by the incorporation in the reaction mixture of water and/or an inert low boiling liquid in order to obtain foamed cellular polyurethane products.

The production of foamed cellular polyurethanes by this process involves careful control of the reaction conditions and of the foam forming and cross-linking reactions in order to obtain foams of uniform pore structure and of satisfactory physical properties. It is also essential to maintain stability in the foam-forming mass prior to the cure of the foam and to avoid collapse of the foam structure before gelation has taken place.

We have now found that certain polysiloxanes containing polar groupings are valuable additives for use in the manufacture of cellular polyurethane materials in that they confer a high degree of stability on the foaming mass prior to the cure of the foam and lead to the formation of cellular polyurethanes of fine even pore structure and good physical properties.

Thus according to the present invention there is provided an improved process for the manufacture of foamed cellular polyurethane materials by the reaction of organic polyisocyanates with hydroxyl group-containing polymers containing at least two isocyanate-reactive groups per molecule, in the presence of water and/or a low boiling point liquid characterised in that there is incorporated in the reaction mixture a polysiloxane containing at least one unit of the general formulae

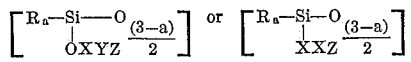

wherein R stands for a monovalent hydrocarbon radical which may optionally be substituted, X stands for a divalent organic radical containing at least two carbon atoms, Y is a polar water solubilizing radical forming a salt with Z which stands for an acid or basic radical of opposite charge to the polar group Y, and $a$ stands for an integer of from 0 to 2.

Preferred polysiloxanes for use in the present invention are linear or branched polysiloxanes containing units of the above general formula.

It is to be understood that the oxygen atoms depicted in the formulae above as $$\frac{O_{3-a}}{2}$$

are linked to further unit of the polysiloxane.

Examples of such linear or branched polysiloxanes include compositions having the general structures $$ZYXO(SiR_2O)_nXYZ \quad (I)$$

$$ZYX(SiR_2O)_mSiR_2XYZ \quad (II)$$

and $$R_bSi[(OSiR_2O)_cXYZ]_{4-b} \quad (III)$$

wherein R, X, Y and Z are as hereinbefore defined, $n$, $m$ and $c$ stand for integers and $b$ stands for 0 or 1.

Especially preferred and useful polysiloxanes are those of the general formulae

 (IV)

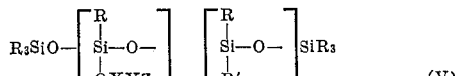 (V)

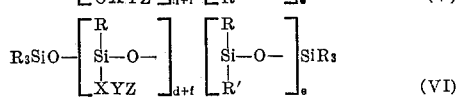 (VI)

wherein R, X, Y and Z are as hereinbefore defined, R' stands for a monovalent hydrocarbon radical, a radical —XH or a radical —OXH, $d$, $e$ and $f$ stand for zero or an integer and are such that $d+f$ equals at least one.

Preferred values of $d+f$ and $e$ are where $d+f$ is 3 and $e$ is 15, $d+f$ is 9 and $e$ is 9 and $d+f$ is 18 and $e$ is 0.

In the general formula given above R may be any monovalent hydrocarbon radical which may optionally be substituted, of which examples include straight or branched chain saturated or unsaturated alkyl radicals such as methyl, ethyl, cyanoethyl, propyl, butyl, butenyl, octyl and octadecyl, cycloalkyl radicals such as cyclohexyl, aryl radicals such as phenyl, chlorophenyl and tolyl and arylalkyl radicals such as benzyl and phenyl ethyl.

When R' is a monovalent hydrocarbon radical it may be any monovalent hydrocarbon radical, examples of which are given above.

The divalent organic radical X may be any divalent hydrocarbon radical such as an alkylene, cycloalkylene, arylene or alkylene arylene radicals, such hydrocarbon radicals may be substituted or not and the carbon chains may be interrupted by hetero atoms such as O, S or N or by groupings such as —COO—, —CO—, or —CONH—, —CONR—, —SO₂—, where the radical contains an aryl group this may be homocyclic or heterocyclic.

Examples of such bivalent radicals include alkylene radicals such as ethylene, butylene, isopropylene, hexylene, dodecylene, octadecylene and neopentylene, cycloalkylene radicals such as cyclohexylene, aryl radicals such as phenylene, tolylene and naphthylene and aralkyl radicals such as xylylene and the radical

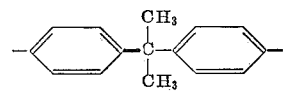

Examples of bivalent radicals containing hetero atoms include

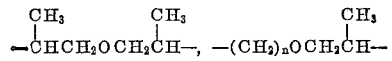

where $n$ is an integer,

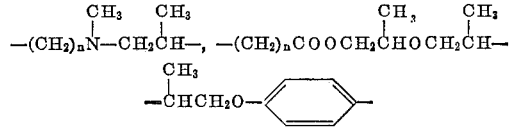

[Structural formulas showing:]

$$-\overset{CH_3}{\underset{}{C}}HCH_2-O-\text{(naphthyl)}, \quad \text{(naphthyl)}-CH_2-$$

$$-CH_2CH_2COO\overset{CH_3}{\underset{}{C}}HCH_2-, \quad -\overset{CH_3}{\underset{}{C}}H-CH_2-\overset{C_6H_5}{\underset{}{N}}-\overset{CH_3}{\underset{}{C}}HCH_2-$$

$$-CH_2\overset{CH_3}{\underset{}{C}}H\cdot COO\overset{CH_3}{\underset{}{C}}HCH_2-, \quad \begin{bmatrix}-CHCO\\ \phantom{-}|\phantom{CHCO}\\CH_2CO\end{bmatrix}N-CH_2CH_2-$$

Y may be any polar water solubilising radical, which radical may carry either a positive or one or two negative charges. Examples of negatively charged radicals include among others sulphate (—OSO$_3$)$^-$, sulphonate (—SO$_3$)$^-$, sulphinate (—SO$_2$)$^-$, phosphonate (—PO$_3$)$^=$ and carboxylate (—COO)$^-$ radicals. Examples of positively charged radicals include among others quaternary ammonium $$[-\underset{R}{\overset{R}{\underset{|}{N}}}-R]^+$$

quaternary phosphonium $$[-\underset{R}{\overset{R}{\underset{|}{P}}}-R]^+$$

and ternary sulphonium radicals $$\begin{bmatrix}-\underset{R}{\overset{R}{\underset{|}{S}}}\end{bmatrix}^+$$

The radical Z may be an anion or a cation according to the nature of the charge on the polar water solubilising group Y.

When the polar group Y carries a negative charge, Z carries a positive charge. Examples of Z include hydrogen, alkali metal cations such as Na$^+$ and K$^+$, ammonium, or substituted ammonium cations. Z may also represent polyvalent cations such as those of divalent metals for example calcium, barium, zinc, tin and lead, such divalent metal may be used in numbers equivalent in total charge to the total number of anions Y. Dialkyl tin radicals may also be employed.

When the polar group Y carries a positive charge, Z may represent hydroxyl or any anion, examples of which include chloride, bromide, iodide, nitrate, methosulphate, p-toluenesulphonate, phenoxide and acetate. Z may also represent polyvalent anions such as sulphate, phosphate or alkyl phosphonate, equivalent in total charge to the total number of charges on the polar groups Y.

The grouping —YZ may also be a group capable of internal salt formation to give what is known as a "zwitterion." Polysiloxanes which may be used in the present invention thus include those polysiloxanes of the general structure given hereinbefore wherein the group —YZ stands for a "zwitterion"; for example "zwitterions" of the following structure.

$$-CH_2-\overset{CH_3}{\underset{CH_3}{\overset{|}{N^+}}}-CH_2-SO_3^-, \quad -CH_2-\overset{CH_3}{\underset{CH_3}{\overset{|}{N^+}}}-CH_2COO^-$$

$$-CH_2-\overset{CH_3}{\underset{CH_3}{\overset{|}{N^+}}}-CH_2-CH_2-SO_3^-, \quad -CH_2-\overset{CH_3}{\underset{CH_3}{\overset{|}{N^+}}}-CH_2CH_2COO^-$$

or $$-CH_2-\overset{CH_3}{\underset{CH_3}{\overset{|}{N^+}}}-CH_2CH_2-O^-$$

The suffixes $d$, $e$ and $f$ may be zero or any integers as defined providing that $d+f$ equals at least one; it is preferred that $d+e+f$ should equal at least 10.

The polysiloxanes preferably used in the process of the present invention may be block copolymers consisting of blocks of the units indicated in brackets in the Formula IV or may be random copolymers of such units in which the units are disposed at random along the chain. Preferred polysiloxanes are polysiloxanes which are random copolymers.

Polysiloxanes are preferred in which the radical R is methyl, phenyl, phenylethyl or 2-cyanoethyl.

Specific examples of useful polysiloxanes include among others, the following random linear polysiloxanes

[Polysiloxane structure I with pyridinium group and (I$^-$)$_3$ counterion]

[Polysiloxane structure with SO$_3^-$ group and (Na$^+$)$_3$ counterion]

[Polysiloxane structure with C$_6$H$_5$ and SO$_3^-$ groups and [N(C$_2$H$_5$)$_4$]$_3^+$ counterion]

and

[Polysiloxane structure with OSO$_3^-$ group and (NH$_4^+$)$_3$ counterion]

One class of polysiloxanes which have been found particularly useful is that class in which in the bivalent radical X the carbon atom attached to silicon, optionally through an oxygen atom, is a carbon atom carrying an alkyl group or alternatively if this carbon atom itself does not carry an alkyl group it itself attached to a carbon atom carrying two alkyl groups. That is to say those polysiloxanes of the general formula above wherein the residue $$\begin{bmatrix}-OSiR\\ \phantom{-}\overset{|}{O}XYZ\end{bmatrix}$$

is $$\begin{bmatrix}-OSiR\\ \phantom{-}\overset{|}{O}CH(W)xYZ\end{bmatrix}$$

or $$\begin{bmatrix}-OSi-\\ \phantom{-}\overset{|}{O}CH_2C(W)_2xYZ\end{bmatrix}$$

wherein W is an alkyl group and $x$ is the remainder of the bivalent radical X and similarly those polysiloxanes of the above general formula wherein the residue $$\begin{bmatrix}-OSiR\\ \phantom{-}\overset{|}{x}YZ\end{bmatrix}$$

is

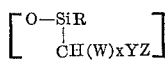

or

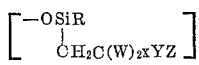

It has also been found that useful polysiloxanes are those in which the divalent radical X carries as a substituent a further group of the formula Y'Z' wherein Y' is a polar water solubilising radical forming a salt with Z' which stands for an acidic or basic radical or opposite charge to the polar group, Y'; that is wherein Y' and Z' have the same meaning as Y and Z.

The further group Y'Z' attached as a substituent to the organic radical X may be comprised of any of the radicals Y and Z mentioned therein.

Thus in the further radical Y'Z', Y' may be any polar water solubilising radical, which radical may carry either a positive or one or two negative charges. Examples of negatively charged radicals include among others sulphate (—OSO$_3$)$^-$, sulphonate(—SO$_3$)$^-$, sulphinate(—SO$_2$)$^-$, phosphonate(PO$_3$)$^=$ and carboxylate (—COO)$^-$ radicals. Examples of positively charged radicals include among other quaternary ammonium

quaternary phosphonium

and ternary sulphonium radicals

The radical Z' may be an anion or a cation according to the nature of the charge on the polar water solubilising group Y'.

When the polar group Y' carries a negative charge, Z' carries a positive charge. Examples of Z' include hydrogen, alkali metal cations such as Na$^+$ and R$^+$, ammonium, or substituted ammonium cations. Z' may also represent polyvalent cations such as those of divalent metals for example calcium, barium, zinc, tin and lead, such divalent metal may be used in numbers equivalent in total charge to the total number of anions Y'. Dialkyl tin radicals may also be employed.

When the polar group Y' carries a positive charge, Z' may represent hydroxyl or any anion, examples of which include chloride, bromide, iodide, nitrate, methosulphate, p-toluenesulphonate, phenoxide and acetate. Z' may also represent polyvalent anions such as sulphate, phosphate or alkylphosphonate, equivalent in total charge to the total number of charges on the polar groups Y'.

It is preferred that the polar group Y' of the group Y'Z' be of a like charge to the other polar group Y attached to the divalent organic radical X.

Thus as examples of the group YZ and the group Y'Z' which may be attached to the same organic divalent radical X there may be mentioned the following pairs of groups coming within the definition of YZ and Y'Z', —SO$_3$Na and —COONa, —OSO$_3$NH$_4$ and —COONH$_4$.

As examples of polysiloxanes containing a group YZ and a group Y'Z' useful in the present invention there may be mentioned, among others, the following

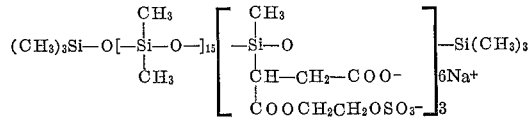

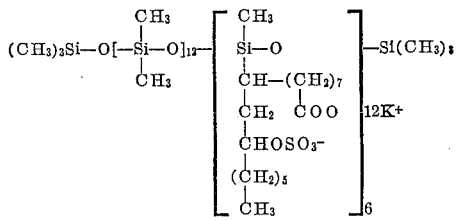

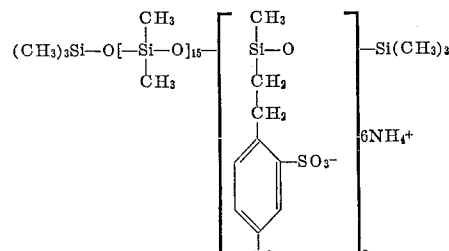

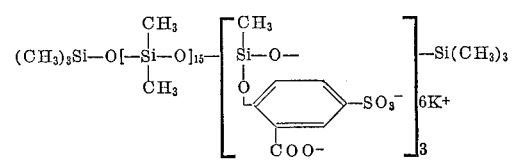

The polysiloxanes used in the present invention may be manufactured by a variety of methods.

For example those polysiloxanes containing the unit

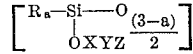

may be prepared by reaction of a polysiloxane containing a silicon bonded hydrogen atom or atoms with alcohols of the formula HOXYZ, or with alcohols which by subsequent salt formation could be converted into alcohols of the general formula HOXYZ.

Examples of suitable polysiloxanes containing silicon bonded hydrogen which may be used as starting materials include linear methyl polysiloxanes having the general formula

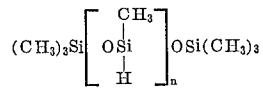

where $n$ is preferably at least 10 and may have a value of 40 or higher, and linear polysiloxanes consisting of random copolymers having the general formula

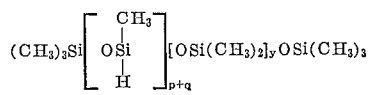

where $p+q$ is at least 3, $p+q+y$ is at least 10 and

may have a value of up to 6. Specific polymers and copolymers which give particularly useful polysiloxanes include the random copolymers of the formula given above wherein $p+q$ is 3 and $y$ is 15, $p+q$ is 9 and $y$ is 9, and $p+q$ is 18 and $y$ is 0.

Other polysiloxanes containing silicon-bonded hydrogen which are suitable for use in the preparation of the desired polar polysiloxanes include phenylmethyl polysiloxanes having the following structures

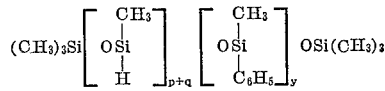

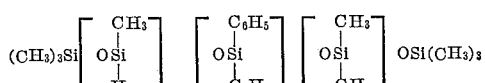

These polysiloxane starting materials containing silicon-bonded hydrogen may be branched or linear and may be prepared by known methods, for example by cohydrolysis or equilibration processes from known appropriate intermediates.

Examples of alcohols HOXYZ suitable as starting materials include those alcohols containing an organic radical X containing at least two carbon atoms and a water solubilising radical Y in the form of a salt with Z as hereinbefore defined, and also those alcohols which by salt formation can be converted into alcohols of the general formula HOXYZ.

Examples of specific alcohols which may be used to prepare the polysiloxanes used in the present process include $$HO(CH_2)_nCOO^-Na^+$$

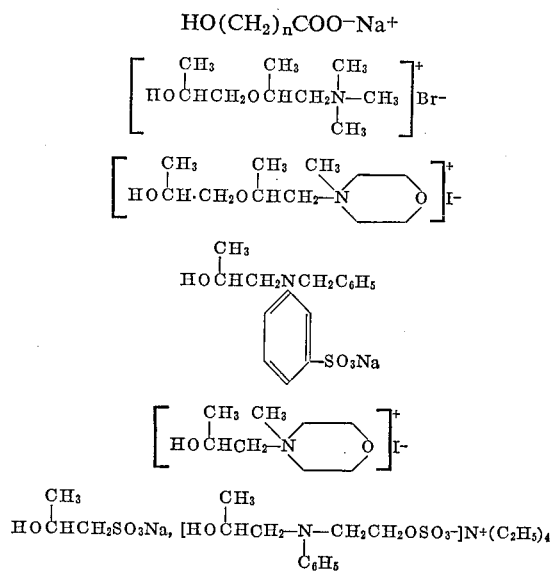

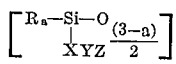

sodium isethionate, and N-2-hydroxypropyl morpholine.

In the preparation of the required polysiloxanes, alcohols of the general formula HOXH may optionally be used in admixture with the alcohols described above. Examples of such alcohols in which X may be the same or different from X in the alcohols above include isopropyl alcohol, butyl alcohol, dodecyl alcohol, octadecyl alcohol, cyclohexyl alcohol, methyl cyclohexyl alcohol, benzyl alcohol and phenylmethyl carbinol.

Those polysiloxanes containing the unit $$\left[ \begin{matrix} R_a-Si-O \\ | \\ XYZ \end{matrix} \frac{(3-a)}{2} \right]$$

may be prepared by reaction of similar silicon-bonded hydrogen containing polysiloxanes with unsaturated alkylenic compounds which in addition to containing an unsaturated —C=C— linkage contain a group —YZ or a group, for example a tertiary amine group, readily converted into a group —YZ.

As examples of such unsaturated compounds there may be mentioned the following

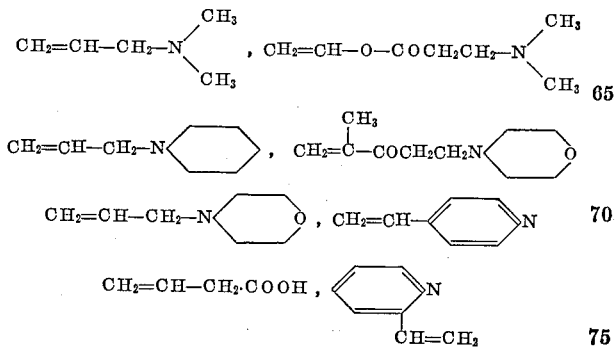

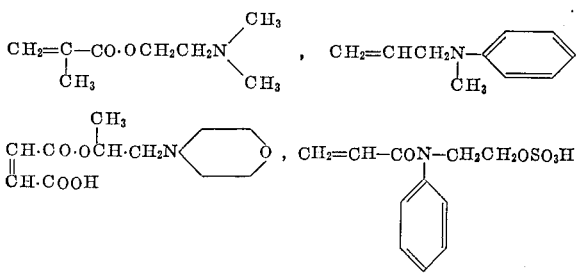

$$CH_3—CH=CH—CH_2N(CH_3)_2$$

The reaction of polysiloxanes containing silicon bonded hydrogen with either alcohols or with unsaturated compounds may be carried out by methods well known in the art.

For example the reaction with an alcohol may be carried out over a wide range of temperature and many conveniently be carried out in the presence of a solvent, for example an aromatic hydrocarbon. It is preferred to carry out the reaction in the presence of a catayslt of the type described in the prior art as effective in this type of reaction, for example bases, acids, Friedel-Crafts halides or metallic salts and complexes.

The reaction with an unsaturated compound may be carried out in the presence or absence of a suitable solvent and if desired an excesss of the unsaturated compound may be used as solvent or diluent It is convenient to carry out the reaction in the presence of a catayslt, usually a compound of platinum, for example chloroplatinic acid; other prior art cataylsts may be employed.

Suitable polysiloxanes may also be prepared by a combination of the above methods, for example a polysiloxane containing silicon-bonded hydrogen may be partly reacted with an alcohol as above described and partly with an unsaturated compound. Any remaining reactive

groups may then be reacted with a further alcohol or an unsaturated compound such as acrylonitrile, styrene or vinyl toluene. Reaction may be carried out with mixtures of more than one alcohol or more than one unsaturated compound.

A preferred class of polysiloxanes for use as additives is that class wherein the group —YZ stands for a quaternary ammonium salt. Such compounds are preferably prepared by reaction of a hydrosilane with an alcohol containing a tertiary amine group, such as for example

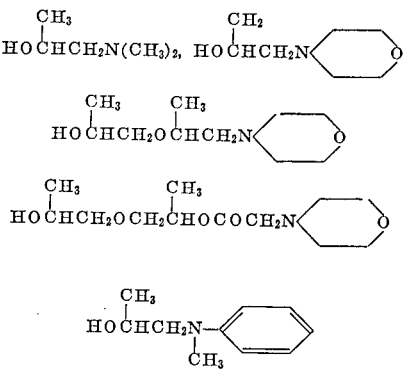

or followed by quaternisation of the amino-siloxane with for example methyl iodide, dimethyl sulphate, benzyl chloride or cetyl bromide. Alternatively quaternisation of the amino-siloxane may be carried out by treatment with formaldehyde and sulfur dioxide to give a "zwitterion" structure,

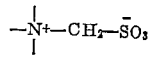

The cellular polyurethane materials advantageously prepared in the presence of the polysiloxanes of the present invention may be prepared by methods and from foam-forming ingredients fully described in the prior art. Thus they may be prepared by the reaction of hydroxyl group-containing polymers such as polyesters, polyethers or polyesteramides containing at least two isocyanate-reactive groups per molecule with organic polyisocyanates and water and/or a low boiling point liquid, optionally in the presence of cataylst or other known additives.

The materials may be mixed continuously or discontinuously and the hydroxyl group-containing polymer may be first reacted with part or the whole of the organic polyisocyanate before the final reaction to give a foam is carried out in a second stage. However, it is generally preferred to carry out the foam preparation in one stage only, by the simultaneous reaction of the foam-forming ingredients, namely the hydroxyl group-containing polymer, the organic polyisocyanate and the water and/or the low boiling point liquid. This convenient one-stage process cannot be satisfactorily carried out with all hydroxyl group-containing polymers. In particular those polymers containing predominantly secondary hydroxyl end-groups do not normally give satisfactory foams using a one-stage process as defined above: using such polymers the foam-forming mass usually partially or wholly collapses with considerable loss of gas and the formation of unsatisfactory high density products. The one-stage process gives particularly unsatisfactory results using polyethers having predominantly secondary hydroxyl end groups.

It has now been found that particularly attractive low density foamed products may be obtained by one stage process from hydroxyl-ended polymers having secondary hydroxyl end groups by incorporation in the reaction mixture of the polysiloxane compounds of the present invention.

The polysiloxanes of the present invention are particularly useful and valuable as additives in the manufacture of cellular foamed polyurethane materials by a single stage process from polyethers having secondary hydroxyl groups.

Thus according to a preferred embodiment of the present invention there is provided a process for the manufacture of cellulose foamed polyurethane materials by the simultaneous reaction of a secondary hydroxyl-ended polymer, especially a polyether, an organic polyisocyanate and water, characterised in that there is incorporated in the reaction mixture a polysiloxane of the type hereinbefore defined.

Examples of secondary hydroxyl-ended polymers suitable for use in the preferred process include polymers and copolymers of 1:2-alkylene oxides such as propylene, butylene-1:2- or butylene-2:3-oxides. Such polyethers may be linear polyether glycols as are prepared, for example, by the polymerisation of an alkylene oxide in the presence of a basic cataylst, such as potassium hydroxide, and a glycol or a primary monoamine. Alternatively there may be used branched polyethers prepared for example by the polymerisation of an alkylene oxide in the presence of a basic cataylst and a substance having more than two active hydrogen atoms per molecule, for example ammonia and polyhydroxy compounds such as glycerol, hexanetriols, trimethylolethane, triethanolamine, pentaerythritol, sorbitol, sucrose and phenol-formaldehyde reaction products, aminoalcohols such as monoethanolamine and diethanolamine and polyamines such as ethylene diamine, hexamethylene diamine, diethylene triamine, tolylene diamine and diamino-diphenylmethane. Branched polyethers may also be produced by copolymerising a cyclic oxide of the type already mentioned with cyclic oxides having a functionality greater than two, for example di-epoxides, glycidol and 3-hydroxy-methyl-oxacyclobutanes.

The polyethers used according to the preferred process of the present invention normally have molecular weights of from 200 to 6000. Mixtures of linear and branched polyethers may be used if desired.

Examples of suitable polyisocyanates include aliphatic diisocyanates such as hexamethylene diisocyanate, aromatic diisocyanates such as tolylene-2:4-diisocyanate, tolylene-2:6-diisocyanate, diphenylmethane-4:4'-diisocyanate, 3-methyldiphenyl methane-4:4'-diisocyanate, m- and p-phenylene diisocyanate, chlorophenylene-2:4-diisocyanate, napthhalene-1:5-diisocyanate, diphenyl-4:4'-diisocyanate, 4:4'-diisocyanato-3:3'-dimethylphenyl and diphenyl ether diisocyanate and cycloaliphatic diisocyanates such as dicyclohexylmethane diisocyanate. Triisocyanates which may be used include aromatic triisocyanates such as 2:4:6-triisocyanato-toluene.

Water is usually employed in amounts of from 1 to 10% by weight of the hydroxyl group-containing polymer, when this is used as the source of carbon dioxide blowing gas.

The polysiloxanes may be incorporated into the foam-forming mixture as such, or may first be mixed with any of the foam-forming ingredients to which they are not reactive, for example the hydroxyl group-containing polymer or the water, and then added to the other foam-forming ingredients. The polysiloxanes are normally incorporated in the process of the present invention in amounts of from 0.1% to 5%, preferably from 0.3% to 1% by weight of the weight of hydroxyl group-containing polymer.

As described fully in the prior art polyurethane foams may be prepared using a variety of additives including in particular catalysts such as basic materials, for example tertiary amines, and soluble organic compounds of heavy metals, for example iron and manganese acetyl acetonate, dibutyl tin dilaurate and stannous octoate; mixtures of catalysts may often be used with advantage. Other additives include surface-active agents, for example oxyethylated phenols, fatty alcohols such as oleyl alcohol or sulphated methyl oleate, and alkyl or aryl polysiloxanes, flame-retardants such as beta-trichloroethyl phosphate and antimony oxide, plasticisers such as tricresyl phosphate and dioctyl phthalate, colouring matters and fillers such as carbon black and silica and colour stabilisers and whitening agents. A further class of additives that may be added comprise antioxidants, for example tert-butyl-catechol and sterically hindered phenols.

There may also be incorporated in the polyurethane foam-forming compositions an inert liquid of boiling point below 75° C. as an additional blowing agent, that is, additional to the water.

Suitable low-boiling point liquids that are chemically inert towards isocyanates and water and have boiling points not exceeding 75° C. preferably between —40° C. and 50° C. include for example fluorinated alkanes such as monofluoromethane, dibromodifluoromethane, 1:1:2-trichloro-1:2:2-trifluoroethane, dichlorodifluoromethane, dichloromonofluoromethane, dichlorotetrafluoroethane, monochlorodifluoromethane and difluoroethyl bromide or mixtures thereof.

Mixtures of these low boiling liquids one with another and/or with non-fluorine-containing substituted or unsubstituted hydrocarbons, may also be used.

Such liquids are usually employed in amounts of from 1% to 200%, preferably from 50% to 125% by weight of the hydroxylic polymer.

The use of the polysiloxanes of the present invention as additives in the manufacture of cellular foamed polyurethane materials by the single-stage or simultaneous process leads to products of low density, of regular pore structure and of good mechanical properties such as tensile strength, resilience and compression set.

The invention is illustrated but not limited by the following examples in which the parts are by weight.

Examples 1–4 describe the preparation of suitable polysiloxanes and Examples 5–9 describe their use in the manufacture of polyurethane foams.

Example 1

28.8 parts of a linear polysiloxane of structure

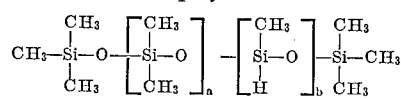

where $a=15$ and $b=3$ and in which the methylsilyl groups are randomly arranged is dissolved in 200 parts of boiling toluene and 0.5 part of stannous 2-ethylhexoate added. A solution of 8.7 parts of N-2-hydroxypropylmorpholine in 50 parts toluene is added during 1 hour. Evolution of hydrogen is complete after 16 hours when the reaction mixture is filtered to remove a small amount of insoluble matter.

4 parts of methyl iodide are added and the reaction mixture allowed to stand for 16 hours. After filtration to remove a small amount of precipitated material the solvent and excess methyl iodide are removed by evaporation under reduced pressure keeping the temperature below 70° C.

There is obtained 35 parts of a waxy solid.

Example 2

As Example 1 using in place of the N-2-hydroxypropylmorpholine 15.6 parts of the compound

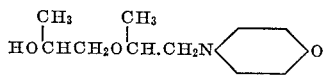

which is obtained by the reaction of two molecules of propylene oxide with one molecule of morpholine in the presence of potassium hydroxide as catalyst.

There is obtained 40 parts of a waxy solid.

Example 3

15.3 parts of a linear polysiloxane of structure analogous to that described in Example 1 but where $a=9$ and $b=9$ is dissolved in 100 parts dry toluene at 110° C. 0.5 part of stannous 2-ethylhexoate is added. A solution of 7.25 parts N-2-hydroxypropylmorpholine in 50 parts toluene is added during 1 hour. Evolution of hydrogen is virtually complete after 16 hours. 3 parts of isopropanol are added. Further evolution of hydrogen occurs and the mixture is boiled under reflux for 6 hours when evolution of hydrogen is virtually complete. The reaction mixture is filtered to remove a small amount of insoluble matter.

3 parts of methyl iodide is added and the reaction mixture allowed to stand for 16 hours. The reaction mixture is filtered to remove a small amount of insoluble matter. The solvent and excess isopropanol are removed by evaporation under reduced pressure at a temperature below 70° C.

There is obtained 21 parts of an almost colourless viscous liquid.

Example 4

As Example 3 using in place of 3 parts isopropanol, 5.76 parts nonanol.

After evaporation of the solvent there is obtained 23 parts of a waxy solid.

Example 5

400 parts of a polyoxypropylene triol of approximate molecular weight 3000 obtained by the reaction of propylene oxide with glycerol, 3.2 parts of the polysiloxane obtained as a reaction product in Example 1, and 0.2 part zinc dinonyldithiophosphate are mixed together. 13.6 parts of water in which has been dissolved 1.32 parts 4-dimethylaminopyridine and 0.50 part lead acetate are added and mixed with the polyether.

170.8 parts of an 80:20 mixture of tolylene-2:4-diisocyanate and tolylene-2:6-diisocyanate are added to the mixture with vigorous agitation and the foaming and still fluid reaction mixture is poured into a mould.

The mixture expands with little loss of gas and cures rapidly to give a low density flexible foam of uniform structure and having good physical properties.

Examples 6 to 9 are carried out as Example 5.

| Example No. | Polyether triol | Catalyst mixture | | Polysiloxane | Water | Tolylene diisocyanate | Remarks |
|---|---|---|---|---|---|---|---|
| | | Dissolved in water | Dissolved in polyether | | | | |
| 6 | 400 | 1.32 parts 4-dimethylaminopyridine, 0.5 part lead acetate. | 0.2 part zinc dinonyldithiophosphate. | 3.2 parts of products of Example 2. | 13.6 | 170.8 | Low density foam of uniform structure; good physical properties. |
| 7 | 400 | do | do | 2.0 parts of product of Example 3. | 13.6 | 170.8 | Do. |
| 8 | 400 | do | do | 2.0 parts of product of Example 4. | 13.6 | 170.8 | Do. |
| 9 | 400 | 1.2 parts triethylene diamine. | 0.2 part di-n-butyl tin dilaurate. | 4.0 parts of product of Example 3. | 11.6 | 152 | Do. |

Example 10

9.5 part of the lithium salt of 12-hydroxystearic acid, 9.5 parts of 2-hydroxypropyl n-nonyl ether and 100 parts of dry toluene are heated at reflux under agitation. 0.2 part of stannous octoate are added, followed by 5 parts of a polysiloxane fluid corresponding approximately to the average general formula

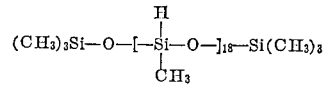

the last being added dropwise over ½ hour to moderate the evolution of hydrogen. The mixture is heated at reflux with agitation for a further 5 hours at which time hydrogen evolution has ceased. The toluene is removed by distillation under reduced pressure, leaving a cream-coloured waxy solid in which the silanic hydrogen groups of the original polysiloxane have been replaced by 2-hydroxypropyl n-nonyl ether residues and lithium 12-hydroxystearate residues. This product can be used without further purification to stabilise the foaming mixture during the preparation of a polyether polyurethane foam by a single-stage process.

0.2 part of zinc dinonyldithiophosphate are dissolved in 400 parts of a polyoxypropylene triol of molecular weight 3000 and a hydroxyl value of 56 mg. KOH per g. obtained by the reaction of propylene oxide with glycerol, 4 parts of the above anionic polysiloxane product are dispersed in the solution with efficient agitation, followed by a suspension of 1 part of lead acetate and 1.76 parts of 4-dimethylaminopyridine in 11.6 parts of water. Finally, to the vigorously agitated mixture are added 182.8 parts of an 80:20 mixture of 2,4-tolylene and 2,6-tolylene diisocyanate, and the mass upon creaming poured into a mould. The foaming mixture loses little gas and a stable fine-textured flexible foam of useful properties is obtained.

Example 11

3.85 parts of 10-undecenoic acid, 0.05 part of cyclohexene platinous chloride and 100 parts of dry toluene are heated under reflux with agitation. 10 parts of a polysiloxane containing silicon-bonded hydrogen and corresponding approximately to the average random general formula

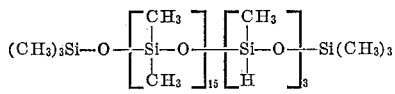

are introduced and the whole refluxed for 19 hours. 0.84 part of sodium hydroxide dissolved in 10 parts of water are added and the water and toluene removed by distillation under reduced pressure. A pale brown waxy solid containing catalyst residues is obtained. This can be used without removal of the catalyst to stabilise the foaming mixture during the preparation of a polyether polyurethane foam by a single-stage process.

4 parts of the above polysiloxane are dispersed by grinding into 400 parts of a polyoxypropylene triol of molecular weight 3000 and a hydroxyl value of 56 mg.-KOH per g. obtained by the reaction of propylene oxide with glycerol, 1.2 parts of 4-dimethylaminopyridine in 11.6 parts of water are added and the mixture thoroughly agitated. 3.3 parts of stannous octoate and 182.8 parts of an 80:20 mixture of 2,4-tolylene and 2,6-tolylene diisocyanates are added simultaneously to the vigorously agitated material and the mass upon creaming is poured into a mould. The foaming mixture rises with little gas loss and a stable low-density fine textured flexible foam is obtained.

Example 12

10 parts of a polysiloxane containing silicon-bonded hydrogen and corresponding approximately to the random average general formula

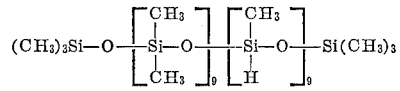

dropwise over 2 hours to a refluxing agitated mixture of 13.2 parts of 10-undecenoic acid, 0.05 part of cyclohexene platinous chloride and 120 parts of dry toluene. The mixture is agitated under reflux for a further 17 hours, after which time 10.7 parts of triethanolamine is added. The toluene is removed by distillation under reduced pressure leaving a viscous liquid coloured dark brown by catalyst residues. This material may be used without removal of the catalyst or other purification to stabilise the foaming mixture during the preparation by a single-stage of a polyether polyurethane foam.

4 parts of the above polysiloxane are dispersed in 400 parts of a polyoxypropylene triol of molecular weight 3000 and a hydroxyl value of 56 m.g. KOH per g. obtained by the reaction of propylene oxide with glycerol, 1.2 parts of 4(dimethylamino) pyridine in 11.6 parts of water are added and the mixture thoroughly agitated. 3.3 parts of stannous octoate and 182.8 parts of an 80:20 mixture of 2,4-tolylene- and 2,6-tolylene-diisocyanates are added simultaneously to the vigorously agitated material and the mass upon creaming is poured into a mould. The foaming mixture rises with no gas loss to yield a stable low-density fine-textured foam of useful properties.

Example 13

56.8 parts of a linear polysiloxane, of structure

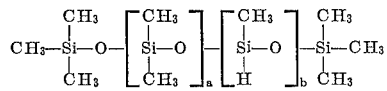

where $a=15$ and $b=3$ and in which the methylsilyl groups are randomly arranged, is dissolved in 100 parts toluene. 0.2 part cyclohexene platinous chloride are added. The solution is added dropwise during 5 hours to a solution of 11.7 parts maleic anhydride in 100 parts toluene at the boil. After heating under reflux for a further 5 hours the reaction mixture is filtered and the toluene is removed by evaporation under reduced pressure. An amber-coloured gelatinous product is obtained. 100 parts acetone are added and the product is neutralised by the addition of a mixture of approximately 15 parts triethanolamine dissolved in 100 parts acetone. The solvent is then evaporated off under reduced pressure, there is obtained approximately 82 parts of an amber-coloured viscous liquid.

Example 14

52 parts of a linear polysiloxane

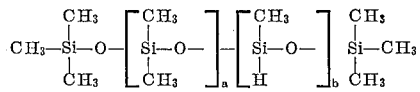

where $a=12$ and $b=3$ and in which the methylsilyl groups are randomly arranged is dissolved in 100 parts toluene. 0.2 part cyclohexene platinous chloride is added. The solution is added dropwise during 5 hours to a solution of 11.7 parts maleic anhydride in 100 parts toluene at the boil. After heating under reflux for a further 5 hours the reaction mixture is filtered and the toluene is removed by evaporation under reduced pressure. An amber-coloured gelatinous product is obtained. 100 parts acetone are added and the product is neutralised by the addition of a mixture of approximately 10 parts triethylamine dissolved in 100 parts acetone. The solvent is then evaporated off under reduced pressure. There is obtained approximately 70 parts of an amber-coloured viscous liquid.

Example 15

400 parts of a polyoxypropylene triol of approximate molecular weight 3000 obtained by the reaction of propylene oxide with glycerol, 3.2 parts of the polysiloxane obtained as a reaction product in Example 1, and 0.5 part stannous octoate are mixed together. 13.6 parts of water in which has been dissolved 1.3 parts triethylene diamine are added and mixed with the polyether.

170.8 parts of an 80:20 mixture of tolylene-2:4-diisocyanate and tolylene-2:6-diisocyanate are added to the mixture with vigorous agitation and the foaming still fluid reaction mixture is poured into the mould.

The mixture expands with little loss of gas and cures rapidly to give a low density flexible foam of uniform structure and good physical properties.

Example 16

As Example 15 using the product of Example 14.

What we claim is:

1. Process for the manufacture of foamed cellular polyurethane materials by the reaction of organic polyisocyanates with hydroxyl group-containing polymers, containing at least two isocyanate-reactive groups per molecule, in the presence of a blowing agent selected from the group consisting of water, at least one low boiling point liquid that is inert towards isocyanates and water and has a boiling point below 75° C., and mixtures thereof characterised in that there is incorporated in the reaction mixture a polysiloxane containing at least one unit of the general formulae

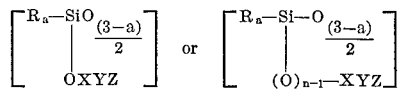

wherein R stands for a monovalent hydrocarbon radical, X stands for a divalent organic radical containing at least two carbon atoms, Y is a polar water solubilising radical, Z is an ion of opposite charge to Y, and Y and Z are capable of forming a salt, $n$ is 1 or 2, and $a$ stands for an integer of from 0 to 2.

2. Process for the manufacture of foamed cellular polyurethane materials as claimed in claim 1 wherein the polysiloxane is a straight chain silicone made up of

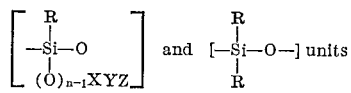

and terminated by two SiR₃ groups, wherein R is a monovalent hydrocarbon radical, X is a divalent organic radical containing at least two carbon atoms, Y is a polar water solubilizing radical, Z is an ion of opposite charge to Y, Y and Z are capable of forming a salt together, and $n$ is 1 or 2.

3. Process for the manufacture of foamed cellular polyurethane materials as claimed in claim 1 wherein the hydroxyl group-containing polymer is a secondary hydroxyl-ended polymer and is reacted simultaneously with the organic polyisocyanate and water.

4. Process for the manufacture of foamed cellular polyurethane materials as claimed in claim 3 wherein the secondary hydroxyl-ended polymer is a polyether.

5. A process for the manufacture of foamed cellular polyurethane materials as claimed in claim 1 wherein, in the surfactant used, Y represents a negatively charged radical and Z stands for a cation.

6. A process for the manufacture of foamed cellular polyurethane materials as claimed in claim 5 wherein X is selected from the group consisting of alkylene, phenylene and carbalkoxyalkylene radicals, Y is selected from the group consisting of $OSO_3-$, $SO_3-$ and $CO_2-$ radicals and Z is selected from the group consisting of lithium, sodium, potassium, ammonium and tertiary amine cations.

7. A process for the manufacture of foamed cellular polyurethane materials as claimed in claim 1 wherein, in the surfactant used, Y represents a positively charged radical and Z stands for an anion.

8. A process for the manufacture of foamed cellular polyurethane materials as claimed in claim 7 wherein, in the surfactant used, X is selected from the group consisting of alkylene and alkoxyalkylene, Y is a N-methylmorpholinium-1-yl radical and Z is an iodide anion.

References Cited by the Examiner
UNITED STATES PATENTS 3,164,557  1/1965  Merten et al. _____ 260—2.5

LEON J. BERCOVITZ, *Primary Examiner.*
DONALD E. CZAJA, *Examiner.*